United States Patent
Fukunishi

(10) Patent No.: US 12,092,253 B2
(45) Date of Patent: Sep. 17, 2024

(54) AIR SUPPLY DUCT FOR FAN AND COMBUSTION DEVICE INCLUDING THE SAME

(71) Applicant: NORITZ CORPORATION, Hyogo (JP)

(72) Inventor: Keigo Fukunishi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 447 days.

(21) Appl. No.: 17/518,562

(22) Filed: Nov. 3, 2021

(65) Prior Publication Data

US 2022/0163158 A1    May 26, 2022

(30) Foreign Application Priority Data

Nov. 20, 2020  (JP) .................................. 2020-193693

(51) Int. Cl.
| | |
|---|---|
| *F23L 1/00* | (2006.01) |
| *F16L 55/033* | (2006.01) |
| *F23L 5/02* | (2006.01) |

(52) U.S. Cl.
CPC .............. *F16L 55/0333* (2013.01); *F23L 5/02* (2013.01)

(58) Field of Classification Search
CPC ................................ F16L 55/0333; F23L 5/02
USPC .......................................................... 431/114
See application file for complete search history.

(56) References Cited

U.S. PATENT DOCUMENTS

| | | | |
|---|---|---|---|
| 9,188,347 B1* | 11/2015 | Ohunna, II ................ | F24D 5/04 |
| 2004/0238271 A1* | 12/2004 | Han ....................... | F04D 29/545 |
| | | | 181/224 |
| 2006/0257707 A1* | 11/2006 | Kaschmitter ..... | H01M 8/04216 |
| | | | 220/4.12 |
| 2010/0132596 A1* | 6/2010 | Longatte ................... | F23G 7/10 |
| | | | 110/267 |
| 2011/0259317 A1* | 10/2011 | Kameyama ............... | F24H 1/40 |
| | | | 126/344 |

FOREIGN PATENT DOCUMENTS

| | | |
|---|---|---|
| JP | S5311633 | 1/1978 |
| JP | 2011133200 | 7/2011 |

\* cited by examiner

*Primary Examiner* — Avinash A Savani
(74) *Attorney, Agent, or Firm* — JCIPRNET

(57) ABSTRACT

An air supply duct for fan is used to guide air to an air intake port of a fan, and includes a duct main body portion in which an air passage extending in a predetermined x direction with one end side set as an air inlet port is formed inside, and an air supply port for supplying air travelling through the air passage to the air intake port of the fan is arranged. A peripheral region of the air supply port of the inside of the duct main body portion is surrounded by wall portions in the periphery except for a communication portion with the air passage, and is configured as a space portion for generating air column vibration and having a width in a y direction intersecting the x direction larger than a width of the air passage. A combustion device including the air supply duct is provided.

16 Claims, 2 Drawing Sheets

AIR SUPPLY DUCT FOR FAN AND COMBUSTION DEVICE INCLUDING THE SAME

CROSS-REFERENCE TO RELATED APPLICATION

Figure 1:
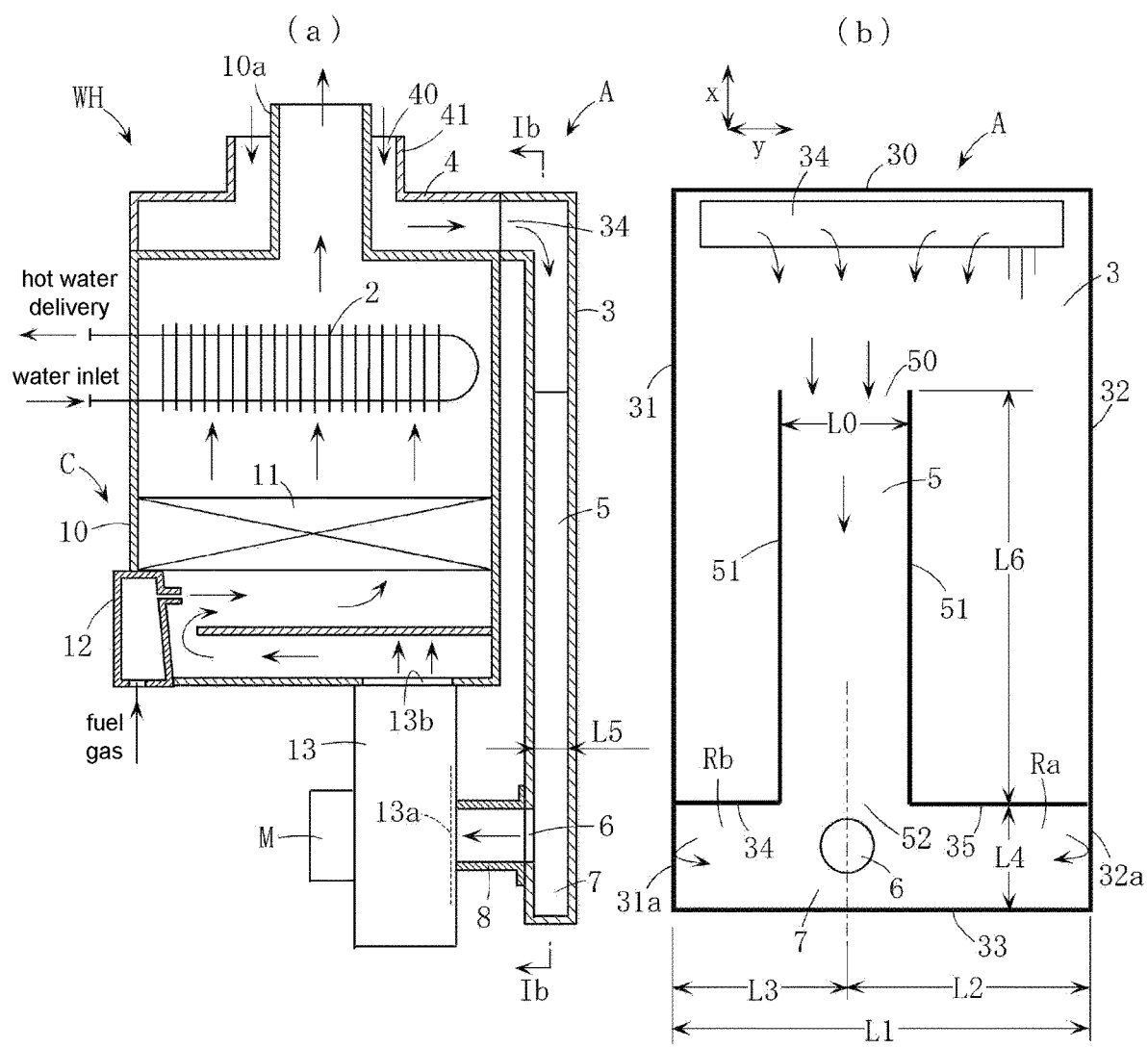

This application claims the priority benefits of Japanese application no. 2020-193693, filed on Nov. 20, 2020. The entirety of the above-mentioned patent application is hereby incorporated by reference herein and made a part of this specification.

BACKGROUND

Technical Field

The disclosure relates to an air supply duct for fan having a noise reduction action and a combustion device including the same.

Related Art

Some combustion devices include a fan that supplies air for combustion to a burner, and uses an air supply duct for fan to guide air to an air intake port of the fan (for example, see Patent literature 1). Regarding this combustion device, it is required to reduce the noise generated from the air supply duct for fan when the fan is driven.

As a measure for responding to this request, for example, there is a measure described in Patent literature 2. In the measure described in the same literature, a cavity portion constituting a resonance type silencer is arranged in an air supply duct for fan. The cavity portion is a section that communicates, via a small hole, with an air passage through which air travels toward the fan. By matching a resonance frequency determined by the cavity portion and the small hole with a resonance frequency of the air supply duct for fan, the noise emitted from the air supply duct for fan can be reduced.

However, it cannot always be said that the above-described conventional technique can obtain an excellent noise reduction effect, and there is still room for improvement.

LITERATURE OF RELATED ART

Patent Literature

[Patent literature 1] Japanese Patent Laid-Open No. 2011-133200

[Patent literature 2] Japanese Utility Model Laid-Open No. 53-11633

SUMMARY

The disclosure provides an air supply duct for fan capable of making a noise reduction effect excellent, and a combustion device including the same.

The following technical methods are taken in the disclosure.

An air supply duct for fan provided by a first aspect of the disclosure is used to guide air to a fan, and includes a duct main body portion in which an air passage extending in a predetermined x direction with one end side set as an air inlet port is formed inside, and an air supply port for supplying air travelling through the air passage to the fan is arranged. A peripheral region of the air supply port of the inside of the duct main body portion is surrounded by wall portions in the periphery except for a communication portion with the air passage, and is configured as a space portion capable of generating air column vibration and having a width in a y direction intersecting the x direction larger than a width of the air passage.

According to this configuration, the following effect can be obtained. That is, when the fan is driven, noise vibration is incident into the space portion from the air passage, the air column vibration is generated in the space portion, and thereby a standing wave having a phase opposite to the noise is generated, and the noise can be canceled. Here, as the standing wave described above, in addition to a standing wave having a wavelength corresponding to the width of the space portion in the y direction, a standing wave can also be generated which has a wavelength corresponding to a width in the y direction from the wall portion (the wall portion capable of functioning as a sound reflection wall) facing the y direction among the wall portions surrounding the space portion to the air supply port. If a plurality of types of standing waves having different wavelengths are generated, the frequency range in which the noise is reduced can be widened, and the noise reduction effect can be made excellent. Furthermore, according to the disclosure, because the space portion in which the air column vibration is generated has a wider shape than the air passage, similarly to a so-called expansion type silencer, the sound pressure is diffused in the space portion, and an effect of attenuating the sound energy can also be obtained. In addition, because the space portion can be arranged near the fan which is a noise source, the noise reduction effect can be made more excellent.

In the disclosure, the space portion is preferably configured in a manner that a standing wave that cancels a sound in a frequency range having a highest sound pressure among noise generated when the fan is driven is generated by the air column vibration.

According to this configuration, the noise can be reduced more effectively.

In the disclosure, in the space portion, a width in the x direction is preferably 15% to 35% of a width in the y direction.

The inventor of the application obtains what a preferable aspect ratio (a ratio of widths in the x and y directions) of the space portion is by a test in order to accurately generate a standing wave having a predetermined frequency in the space portion to reduce the noise (detailed data is omitted). As a result of the test, the gist becomes clear that the numerical range described above is particularly preferable.

In the disclosure, the space portion preferably has a first region protruding to one side of the air passage and the air supply port in the y direction, and a second region protruding to the opposite side with respect to the first region. The widths of the first region and the second region in the y direction are preferably different from each other.

According to this configuration, as the standing wave generated in the space portion, a standing wave corresponding to the entire space portion, a standing wave corresponding to the first region, and a standing wave corresponding to the second region can be generated. Therefore, the noise cancelling effect obtained by these standing waves can be made further excellent. In addition, it is not necessary to increase the size of the space portion, and an enlargement of the air supply duct for fan can also be suppressed.

In the disclosure, in a front cross-sectional view of the air supply duct for fan, the air supply port is preferably located on an extension line of the air passage in the x direction.

According to this configuration, the air flow from the air passage to the air supply port can be made smooth, and the air supply resistance can be reduced.

A combustion device provided by a second aspect of the disclosure includes a burner, a fan for supplying air to the burner, and an air supply duct for fan for guiding air to the fan. The air supply duct for fan provided by the first aspect of the disclosure is used as the air supply duct for fan.

According to this configuration, the same effects as described for the air supply duct for fan provided by the first aspect of the disclosure can be obtained.

Other characteristics and advantages of the disclosure will become more apparent from the following description of embodiments of the disclosure with reference to the accompanying drawings.

BRIEF DESCRIPTION OF THE DRAWINGS (a) of FIG. 1 is a schematic cross-sectional view showing an example of a combustion device including an air supply duct for fan according to the disclosure, and (b) of FIG. 1 is a cross-sectional view taken along a line 1b-1b in (a) of FIG. 1 (a front cross-sectional view of the air supply duct for fan).

Figure 2:
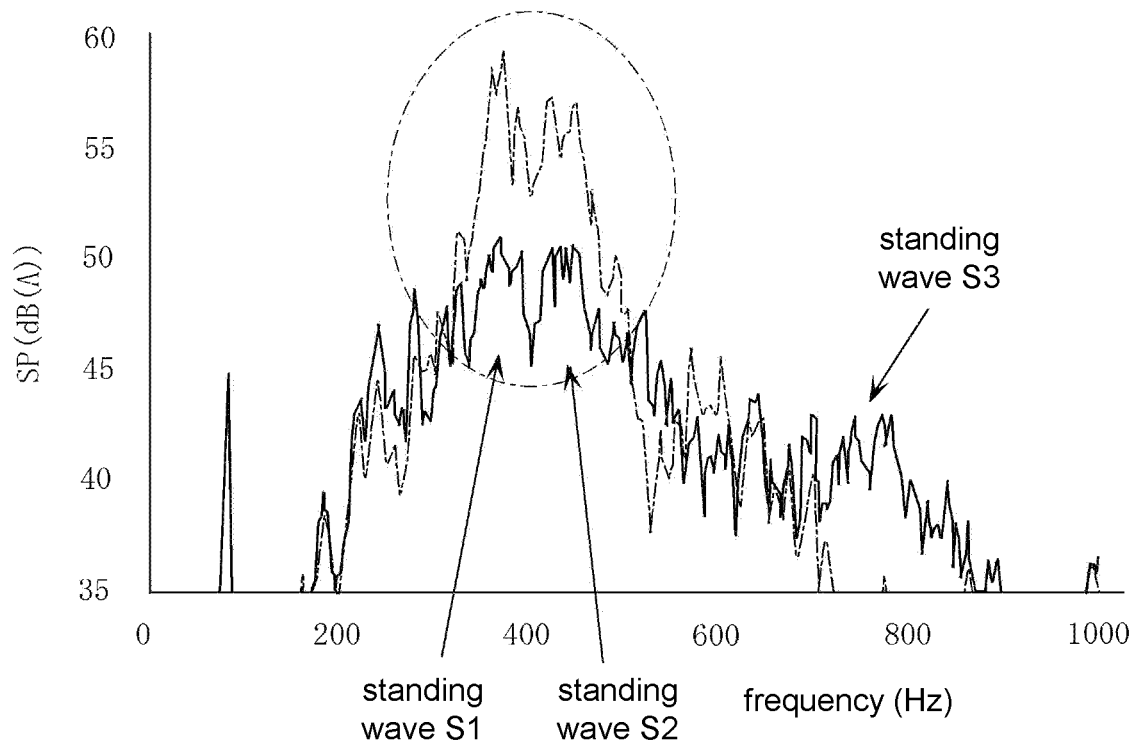

FIG. 2 is a diagram showing an example of noise generated in the air supply duct for fan of the combustion device shown in FIG. 1.

DESCRIPTION OF THE EMBODIMENTS

Hereinafter, exemplary embodiments of the disclosure are specifically described with reference to the drawings.

A combustion device C shown in FIG. 1 has the same basic configuration as the combustion device described in Patent literature 1 except for a configuration of an air supply duct for fan A described later. That is, this combustion device C is used as a component element of a hot water supply device WH. The hot water supply device WH has a configuration in which a heat exchanger 2 with water to be heated flows therein is arranged in a can body 10 of the combustion device C and can be heated by a burner 11 such as a gas burner or the like.

In addition to the can body 10 and the burner 11 described above, the combustion device C includes a fuel gas supply head 12 that ejects fuel gas to a location where the burner 11 is arranged, a fan 13 for supplying air for combustion into the can body 10, and the air supply duct for fan A. The fan 13 has a configuration in which a rotation blade (not shown) is accommodated in a casing and can be freely driven and rotated by a motor M, for example. A reference sign 13b indicates an air sending port of the fan 13.

The air supply duct for fan A includes a duct main body portion 3 and an auxiliary portion 4 continuously arranged on the upper portion of the duct main body portion 3. A tubular portion 41 forming an air supply port for duct 40 is arranged in the auxiliary portion 4. In the combustion device C of the embodiment, a so-called double pipe air supply/exhaust method is adopted, and the tubular portion 41 of the auxiliary portion 4 is arranged in a manner of surrounding an air exhaust tube portion 10a at the upper portion of the can body 10.

The duct main body portion 3 is a member for guiding the air flowing into the auxiliary portion 4 to an air intake port 13a of the fan 13, and has a relatively flat hollow shape with a rectangular front view. In addition to an upper wall portion 30, a left side wall portion 31, a right side wall portion 32, and a lower wall portion 33 that surround the outer periphery of the duct main body portion 3, an opening portion 34 for introducing air from the auxiliary portion 4 into the duct main body portion 3, an air passage 5, an air supply port 6, and a space portion 7 for air column vibration are arranged in the duct main body portion 3.

The air passage 5 is sandwiched by a pair of left and right wall portions 51 and extends in a vertical height direction (an example of an x direction of the disclosure) with an appropriate length L6, and has an air inlet port 50 formed at an upper end. The air flowing into the duct main body portion 3 from the opening portion 34 enters the air passage 5 from the air inlet port 50 and proceeds downward. The air supply port 6 is arranged in the space portion 7 at a position on an extension line below the air passage 5. The air supply port 6 and the air intake port 13a of the fan 13 are connected via a tubular member 8, and air is supplied to the fan 13 from the air supply port 6.

The space portion 7 is arranged so as to be connected to a terminal portion (a lower portion) of the air passage 5, and the surrounding of the space portion 7 is surrounded by wall portions 33 to 35, 31a, and 32a except for a communication portion 52 (an opening portion for communication) with the air passage 5. Among these wall portions, the wall portion 31a is a part of the left side wall portion 31 and the wall portion 32a is a part of the right side wall portion 32. A width L1 of the space portion 7 in a lateral direction (an example of a y direction of the disclosure) is larger than a width L0 of the air passage 5. In addition, the air passage 5 and the air supply port 6 are located at a position offset from the center of the space portion 7 in the lateral width direction. The space portion 7 can be divided into a first region Ra protruding to one side (the right side of (b) of FIG. 1) of the air passage 5 and the air supply port 6, and a second region Rb protruding to the opposite side with respect to the first region Ra, and a width L2 of the first region Ra and a width L3 of the second region Rb are different from each other due to the offset described above.

When a sound is incident into the space portion 7 from the air passage 5, in the space portion 7, the sound is reflected by the wall portions 31a and 32a serving as end portions of the space portion 7 in the lateral width direction, and causes air column vibration. Thereby, three types of standing waves S1 to S3 corresponding to the widths L1 to L3 of the space portion 7 are generated. These standing waves S1 to S3 have an opposite phase relationship with the incident sound (noise) to the space portion 7. In addition, the widths L1 to L3 and frequencies f1 to f3 of three types of the standing waves S1 to S3 have relationships of the following Formulas 1 to 3. Reference character c denotes a sound speed.

[Equation 1]

$$L1 = \frac{1}{4}\frac{c}{f1} \qquad \text{Formula 1}$$

$$L2 = \frac{1}{4}\frac{c}{f2} \qquad \text{Formula 2}$$

$$L3 = \frac{1}{4}\frac{c}{f3} \qquad \text{Formula 3}$$

In the embodiment, of three types of the standing waves S1 to S3 having the frequencies f1 to f3 described above, the two standing waves S1 and S2 are set to be in a frequency range having a highest sound pressure among the noise generated from the air supply duct for fan A when the combustion device C is operated.

To give a specific example, when the frequency range in which the noise generated when the combustion device C is operated has the highest sound pressure is about 400 Hz, the widths L1 and L2 are respectively set to, for example, 280 mm and 160 mm. In this case, the frequencies of the standing waves S1 and S2 are 296 Hz and 518 Hz respectively. The width L3 is 120 mm, and the frequency of the standing wave S3 is 691 Hz.

In the space portion 7, a width L4 in the vertical height direction is preferably set to be in a range of 15% to 35% of the width L1.

In addition, a width L5 of each of the space portion 7 and the air passage 5 of the duct main body portion 3 in a front direction (a width in a left-right direction in (a) of FIG. 1) is smaller than the above-described width L3 of the second region Rb.

According to the above-described air supply duct for fan A and the combustion device C including the same, the following actions can be obtained.

First, when the fan 13 is driven, as described above, a sound is incident into the space portion 7 and the air column vibration is caused, and thereby three types of the standing waves S1 to S3 are generated. Because these standing waves S1 to S3 are opposite in phase with respect to the incident sound, an action of cancelling noise is generated. As a result, for example, a noise reduction effect shown in FIG. 2 can be obtained.

In the same drawing, the virtual line is data of a comparison example to which the embodiment is not applied, and the sound pressure in the vicinity of 400 Hz is high. Correspondingly, the solid line in the same drawing is data in the case of the embodiment, and the sound pressure in the vicinity of 400 Hz is considerably reduced due to the noise cancelling action by the standing waves S1 and S2. On the other hand, although the sound pressure in the vicinity of 700 Hz to 800 Hz rises slightly due to the presence of the standing wave S3, the slight rise of the sound pressure in this frequency range has no special problem in noise reduction and can be ignored.

As described above, according to the embodiment, two types of the standing waves S1 and S2 having different frequencies are used to cancel the noise in the vicinity of 400 Hz, and thus the noise reduction effect can be made excellent as compared with the case of using only one type of the standing wave, for example. In addition, in the embodiment, because the space portion 7 is wider than the air passage 5, the sound pressure is diffused in the space portion 7, and an effect of attenuating the sound energy can also be obtained. Because the space portion 7 can be arranged near the air intake port 13a of the fan 13 which is a noise source, the noise reduction effect can also be made more excellent.

As described above, in the space portion 7, the width L4 in the vertical height direction is set to be in a range of 15% to 35% of the width L1, and additionally, the width L5 of each of the space portion 7 and the air passage 5 is smaller than the width L3 of the second region Rb. If the width L4 and the width L5 are within this dimension range, it becomes clear by a test of the present inventor that the action intended by the disclosure can be accurately obtained.

The disclosure is not limited to the contents of the above-described embodiment. The specific configuration of each portion of the air supply duct for fan and the combustion device according to the disclosure can be variously and freely designed and changed within the scope intended by the disclosure.

In the above-described embodiment, the width L2 of the first region Ra and the width L3 of the second region Rb of the space portion 7 are different, but the disclosure is not limited thereto, and the widths L2 and L3 may also have a relationship of L2=L3.

From the viewpoint of smoothing the air flow, it is preferable to arrange the air supply port 6 on the extension line of the air passage 5, but the disclosure is not limited thereto, and the air supply port 6 can also be arranged at a position deviated from the extension line of the air passage 5.

The x and y directions referred to in the disclosure are not limited to the vertical height direction and the horizontal direction respectively.

In the above-described embodiment, the overall shape of the duct main body portion of the air supply duct for fan is a substantially rectangular shape in a front view, but the disclosure is still not limited thereto, and the overall shape of the duct main body portion can be formed into various shapes.

The combustion device according to the disclosure is not limited to that for a hot water supply device, and can also be configured as a combustion device for heating, incinerator, or the like. The specific type of the fan is also not limited.

What is claimed is:

1. An air supply duct for fan, which is used to guide air to a fan,
   comprising a duct main body portion in which an air passage extending in a predetermined x direction with one end side set as an air inlet port is formed inside, and an air supply port for supplying air travelling through the air passage to the fan is arranged, wherein
   a peripheral region of the air supply port of inside of the duct main body portion is surrounded by wall portions in a periphery except for a communication portion with the air passage, and is configured as a space portion capable of generating air column vibration and having a width in a y direction intersecting the x direction larger than a width of the air passage, wherein
   the space portion is configured in a manner that a standing wave that cancels a sound in a frequency range having a highest sound pressure among noise generated when the fan is driven is generated by the air column vibration.

2. An air supply duct for fan, which is used to guide air to a fan,
   comprising a duct main body portion in which an air passage extending in a predetermined x direction with one end side set as an air inlet port is formed inside, and an air supply port for supplying air travelling through the air passage to the fan is arranged, wherein
   a peripheral region of the air supply port of inside of the duct main body portion is surrounded by wall portions in a periphery except for a communication portion with the air passage, and is configured as a space portion capable of generating air column vibration and having a width in a y direction intersecting the x direction larger than a width of the air passage, wherein
   in the space portion, a width in the x direction is 15% to 35% of a width in the y direction.

3. The air supply duct for fan according to claim 1, wherein
   in the space portion, a width in the x direction is 15% to 35% of a width in the y direction.

4. An air supply duct for fan, which is used to guide air to a fan,
   comprising a duct main body portion in which an air passage extending in a predetermined x direction with one end side set as an air inlet port is formed inside, and an air supply port for supplying air travelling through the air passage to the fan is arranged, wherein a peripheral region of the air supply port of inside of the duct main body portion is surrounded by wall portions in a periphery except for a communication portion with the air passage, and is configured as a space portion capable of generating air column vibration and having a width in a y direction intersecting the x direction larger than a width of the air passage, wherein the space portion comprises a first region protruding to one side of the air passage and the air supply port in the y direction, and a second region protruding to an opposite side with respect to the first region, and widths of the first region and the second region in the y direction are different from each other.

5. The air supply duct for fan according to claim 1, wherein the space portion comprises a first region protruding to one side of the air passage and the air supply port in the y direction, and a second region protruding to an opposite side with respect to the first region, and widths of the first region and the second region in the y direction are different from each other.

6. The air supply duct for fan according to claim 2, wherein the space portion comprises a first region protruding to one side of the air passage and the air supply port in the y direction, and a second region protruding to an opposite side with respect to the first region, and widths of the first region and the second region in the y direction are different from each other.

7. The air supply duct for fan according to claim 3, wherein the space portion comprises a first region protruding to one side of the air passage and the air supply port in the y direction, and a second region protruding to an opposite side with respect to the first region, and widths of the first region and the second region in the y direction are different from each other.

8. The air supply duct for fan according to claim 1, wherein in a front cross-sectional view of the air supply duct for fan, the air supply port is located on an extension line of the air passage in the x direction.

9. The air supply duct for fan according to claim 2, wherein in a front cross-sectional view of the air supply duct for fan, the air supply port is located on an extension line of the air passage in the x direction.

10. The air supply duct for fan according to claim 3, wherein in a front cross-sectional view of the air supply duct for fan, the air supply port is located on an extension line of the air passage in the x direction.

11. The air supply duct for fan according to claim 4, wherein in a front cross-sectional view of the air supply duct for fan, the air supply port is located on an extension line of the air passage in the x direction.

12. The air supply duct for fan according to claim 5, wherein in a front cross-sectional view of the air supply duct for fan, the air supply port is located on an extension line of the air passage in the x direction.

13. The air supply duct for fan according to claim 6, wherein in a front cross-sectional view of the air supply duct for fan, the air supply port is located on an extension line of the air passage in the x direction.

14. A combustion device, comprising a burner, a fan for supplying air to the burner, and an air supply duct for fan for guiding air to the fan, wherein the air supply duct for fan according to claim 1 is used as the air supply duct for fan.

15. A combustion device, comprising a burner, a fan for supplying air to the burner, and an air supply duct for fan for guiding air to the fan, wherein the air supply duct for fan according to claim 2 is used as the air supply duct for fan.

16. A combustion device, comprising a burner, a fan for supplying air to the burner, and an air supply duct for fan for guiding air to the fan, wherein the air supply duct for fan according to claim 4 is used as the air supply duct for fan.

* * * * *